(12) United States Patent
Falter et al.

(10) Patent No.: US 9,933,028 B2
(45) Date of Patent: Apr. 3, 2018

(54) CALIPER DISC BRAKE OF A VEHICLE, IN PARTICULAR A COMMERCIAL VEHICLE, AND HOLDING-DOWN DEVICE OF SUCH A BRAKE

(71) Applicant: WABCO EUROPE BVBA, Brussels (BE)

(72) Inventors: Wolfgang Falter, Heidelberg (DE); Oliver Friebus, Heidelberg (DE); Hellmut Jäger, Ludwigshafen (DE); Hans-Christian Jungmann, Gorxheimertal (DE)

(73) Assignee: WABCO Europe BVBA, Brussels (BE)

( * ) Notice: Subject to any disclaimer, the term of this patent is extended or adjusted under 35 U.S.C. 154(b) by 0 days.

(21) Appl. No.: 14/890,721

(22) PCT Filed: May 2, 2014

(86) PCT No.: PCT/EP2014/001174
§ 371 (c)(1),
(2) Date: Nov. 12, 2015

(87) PCT Pub. No.: WO2014/183838
PCT Pub. Date: Nov. 20, 2014

(65) Prior Publication Data
US 2016/0116009 A1 Apr. 28, 2016

(30) Foreign Application Priority Data
May 13, 2013 (DE) .................. 10 2013 008 155

(51) Int. Cl.
*F16D 65/097* (2006.01)
*F16D 55/22* (2006.01)
(Continued)

(52) U.S. Cl.
CPC ......... *F16D 65/0978* (2013.01); *F16D 55/22* (2013.01); *F16D 55/225* (2013.01); *F16D 65/092* (2013.01)

(58) Field of Classification Search
CPC ............. F16D 65/0977; F16D 65/0974; F16D 65/0973; F16D 65/0975; F16D 2055/007; F16D 65/0978
See application file for complete search history.

(56) References Cited

U.S. PATENT DOCUMENTS 5,363,944 A * 11/1994 Thiel ..................... F16D 55/227
188/250 G
2008/0264739 A1 * 10/2008 Pritz ................... F16D 65/0043
188/73.31
(Continued)

FOREIGN PATENT DOCUMENTS

DE 102006002306 A1 * 8/2007 ......... F16D 65/0977
DE 102007036353 B3 2/2009
(Continued)

*Primary Examiner* — Bradley T King
*Assistant Examiner* — Stephen M Bowes
(74) *Attorney, Agent, or Firm* — Brinks Gilson & Lione (57) ABSTRACT

A caliper disc brake of a vehicle has a brake disc with an axis of rotation, a brake caliper, a brake anchor plate, a force transmission element, such asa lining support and/or a pressure plate, a holding-down spring for holding down the force transmission element, and a holding-down device (36) which is held and supported on the caliper by a holding device, which pretensions the holding-down spring adially against the force transmission device and tangentially in the direction of rotation against the force transmission device during forwards travel. The holding device has a center line parallel to the axis of rotation. The tangential pre-tensioning is at least partially due to the dimensions (V1, V2) of the
(Continued)

holding-down device in the tangential direction from the center line (M) being larger on the disc exit side than on the disc entry side.

11 Claims, 13 Drawing Sheets

(51) Int. Cl.
*F16D 65/092* (2006.01)
*F16D 55/225* (2006.01)

(56) References Cited

U.S. PATENT DOCUMENTS

| | | | | |
|---|---|---|---|---|
| 2009/0236188 | A1* | 9/2009 | Raffin | F16D 65/0974 188/73.31 |
| 2010/0116600 | A1* | 5/2010 | Wolf, Jr. | F16D 65/0978 188/73.31 |
| 2010/0252370 | A1* | 10/2010 | Raffin | F16D 65/0978 188/1.11 W |
| 2010/0258384 | A1* | 10/2010 | Kreuzeder | F16D 65/0976 188/1.11 L |
| 2011/0005872 | A1* | 1/2011 | Baumgartner | F16D 65/0978 188/73.31 |
| 2015/0184710 | A1* | 7/2015 | Peschel | F16D 55/225 188/73.32 |

FOREIGN PATENT DOCUMENTS

| | | |
|---|---|---|
| DE | 102007046945 A1 | 5/2009 |
| EP | 0694707 A2 | 1/1996 |

* cited by examiner

CALIPER DISC BRAKE OF A VEHICLE, IN PARTICULAR A COMMERCIAL VEHICLE, AND HOLDING-DOWN DEVICE OF SUCH A BRAKE

TECHNICAL FIELD OF THE INVENTION

The invention relates to a caliper disc brake of a vehicle, in particular a commercial vehicle, with a brake disc having an axis of rotation, a brake caliper, a back plate assembly, a force transmission element, such as a brake-pad plate and/or a pressure plate, which is guided and supported in a channel of the brake caliper or the back plate assembly, a hold-down spring for holding down the force transmission element and a hold-down device, which is held and supported on the caliper by a holding device, pretensions the hold-down spring radially against the force transmission device and pretensions the hold-down spring against the force transmission device tangentially in the direction of rotation in forwards travel, wherein the holding device has a centerline lying parallel to the axis of rotation.

BACKGROUND OF THE INVENTION

Brakes of the type referred to at the beginning are disclosed, for example, by EP 694 707 B3. A characteristic feature of the brakes according to the state of the art is the axial offset of the hold-down yoke by way of an eccentric interlocking support in the brake caliper, in order to exert not only the radial but also a tangential pretensioning on the brake linings via the positively interlocking engagement in the hold-down springs specially formed for this purpose.

The basic principle of radial and tangential pretensioning has proved its worth and should be retained. According to the invention, however, design and functional modifications are made to the brake caliper and to the relevant parts of the hold-down system, in order to afford greater efficiency and greater versatility.

Figure 1:
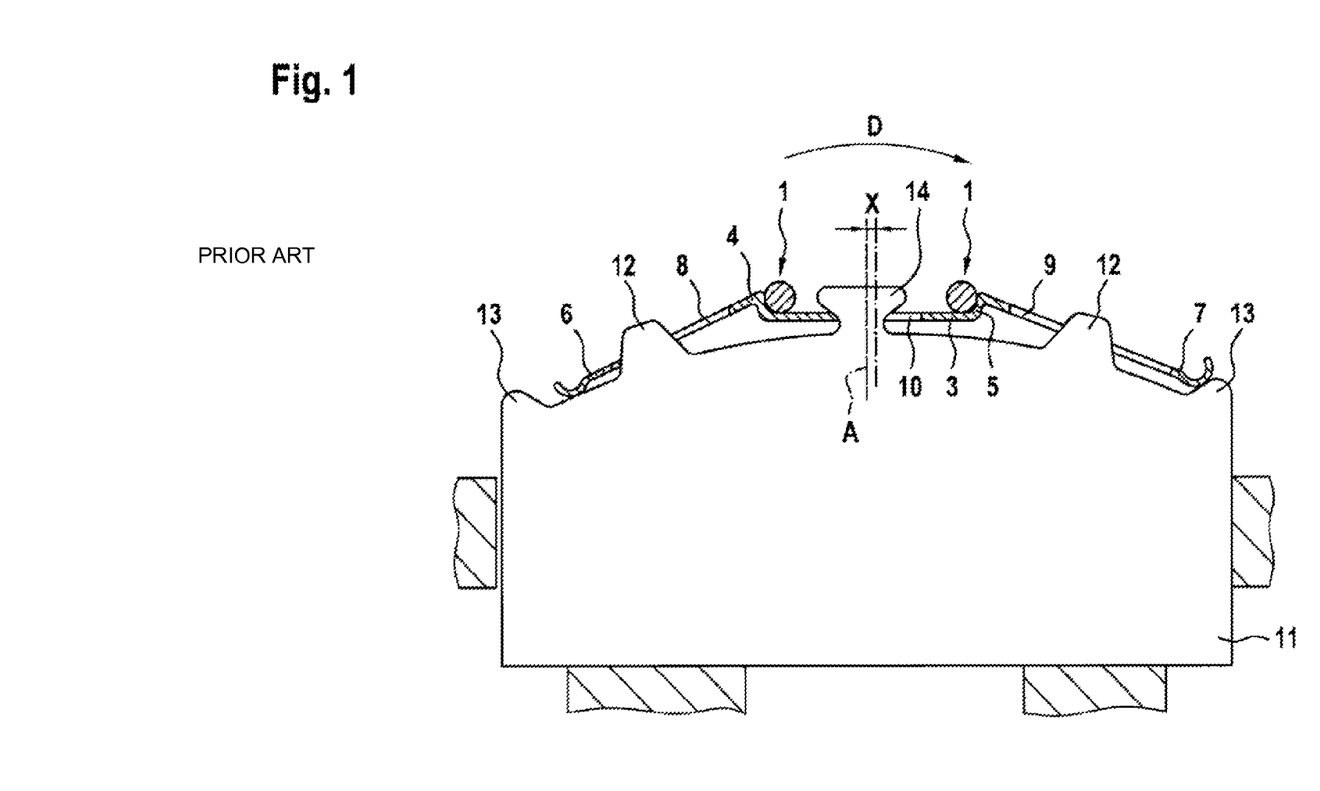
FIGS. 1 and 2 show caliper disc brakes according to the state of the art.
Figure 2:
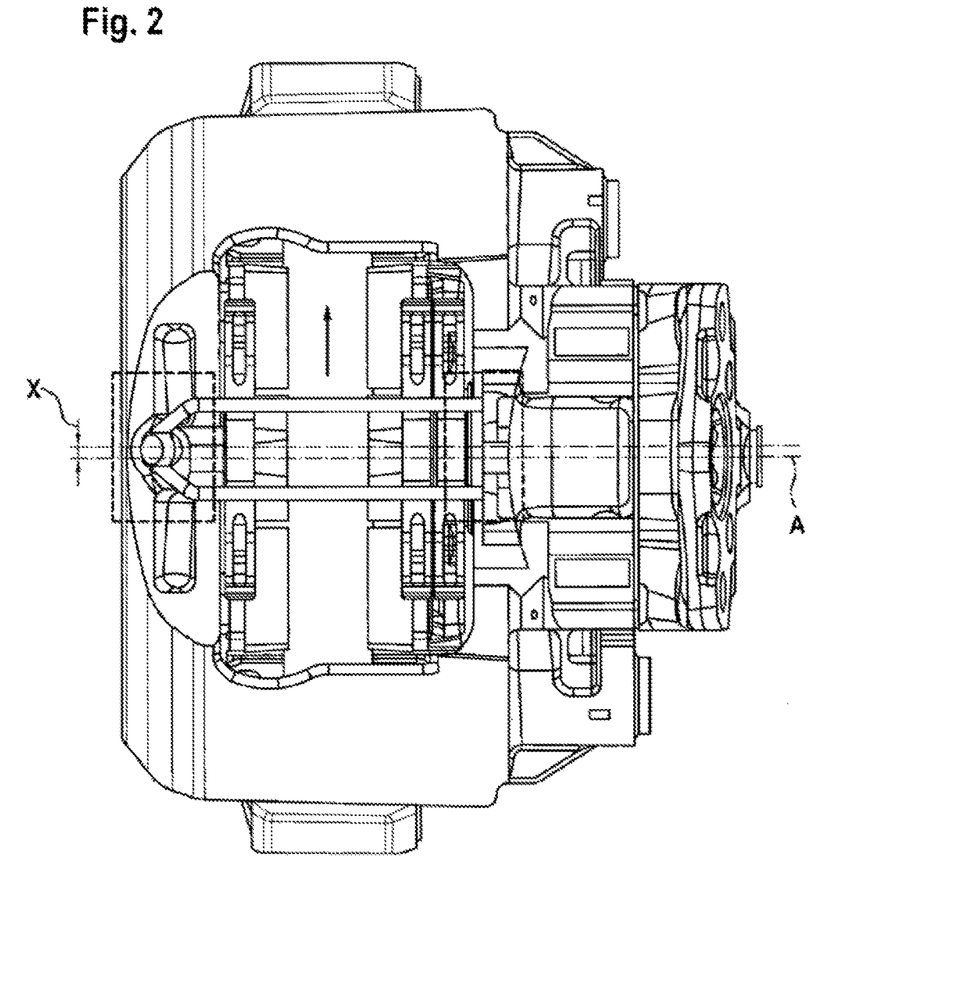
Figure 3:
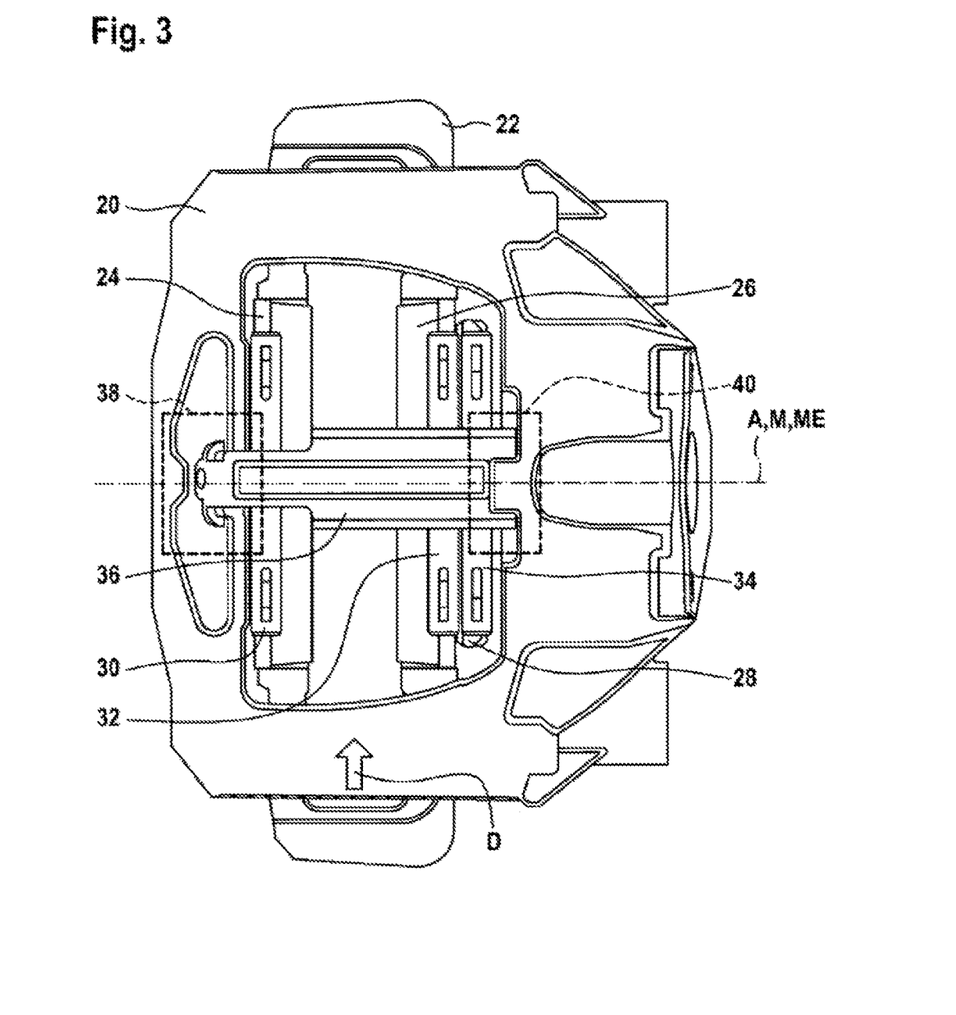
FIGS. 3 and 4 show diagrammatic top views of a caliper disc brake according to one exemplary embodiment of the invention.
Figure 4:
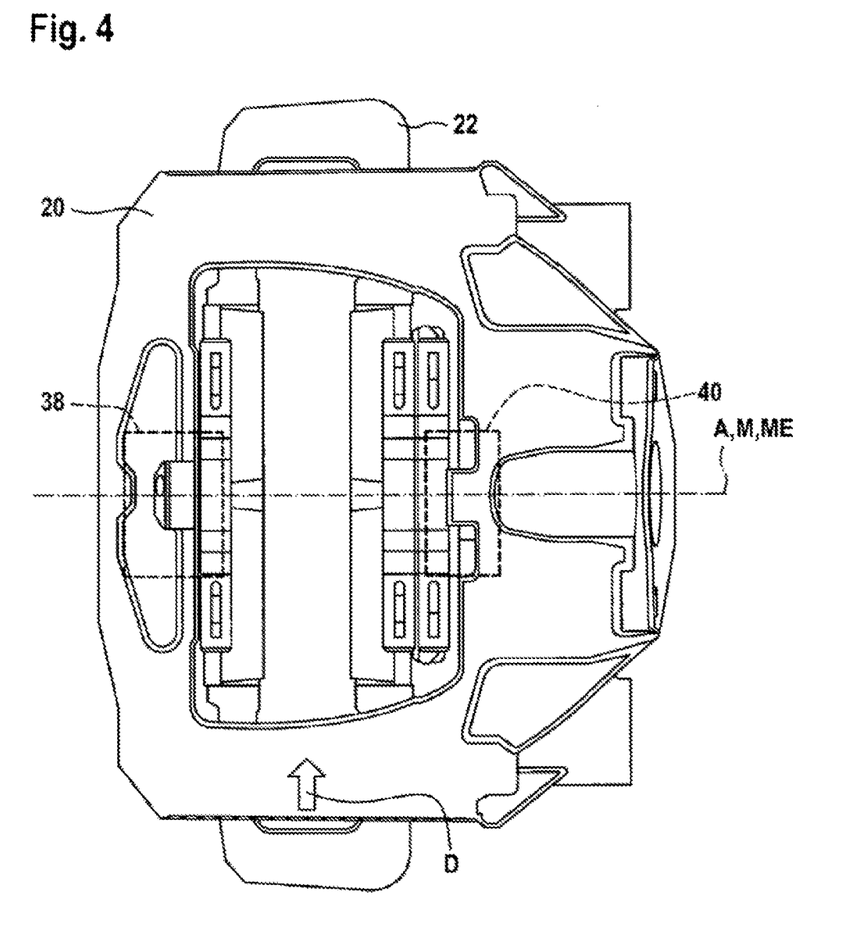
Figure 5:
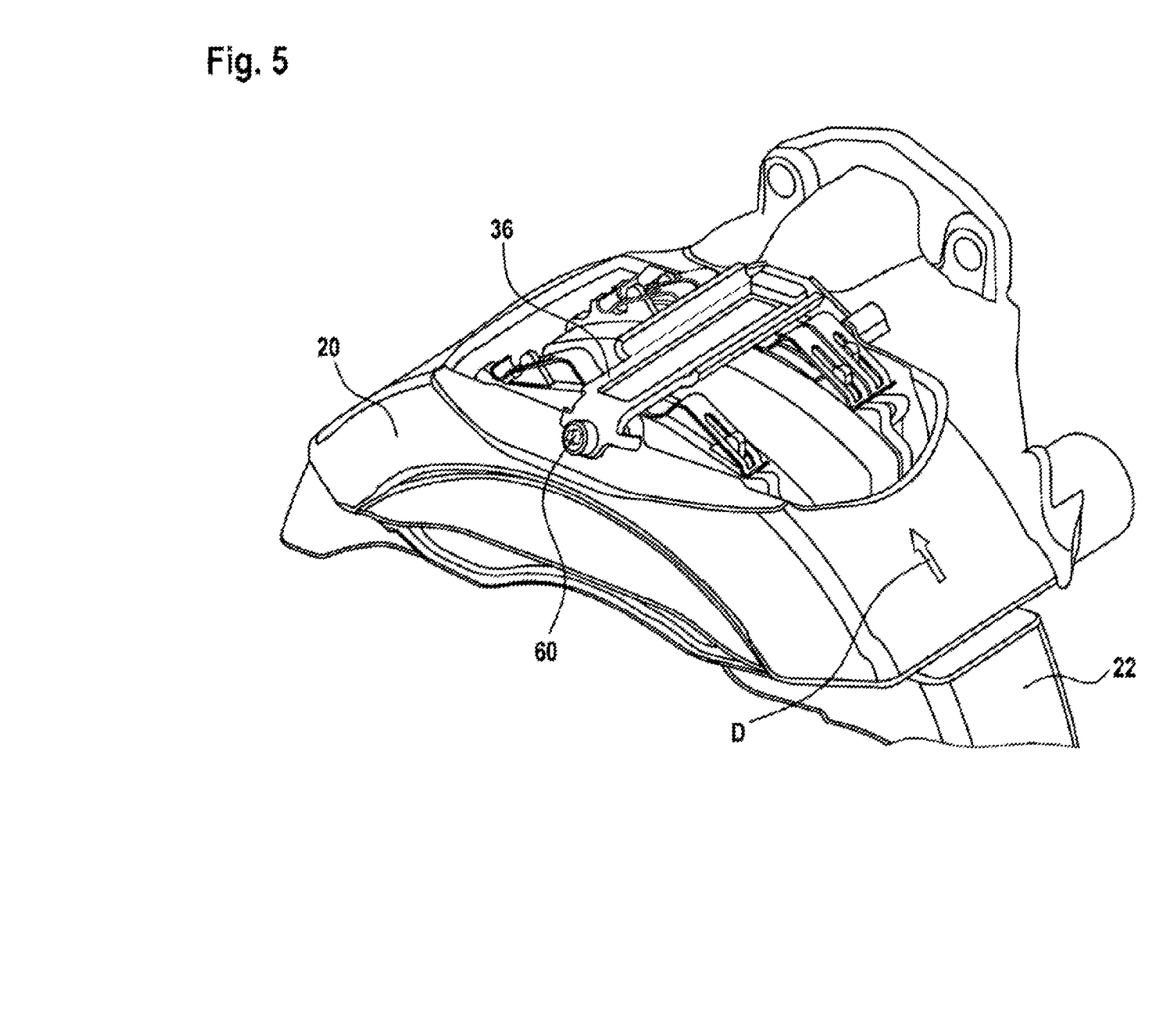
FIG. 5 shows a diagrammatic, perspective view of the brake according to FIGS. 3 and 4.
Figure 6:
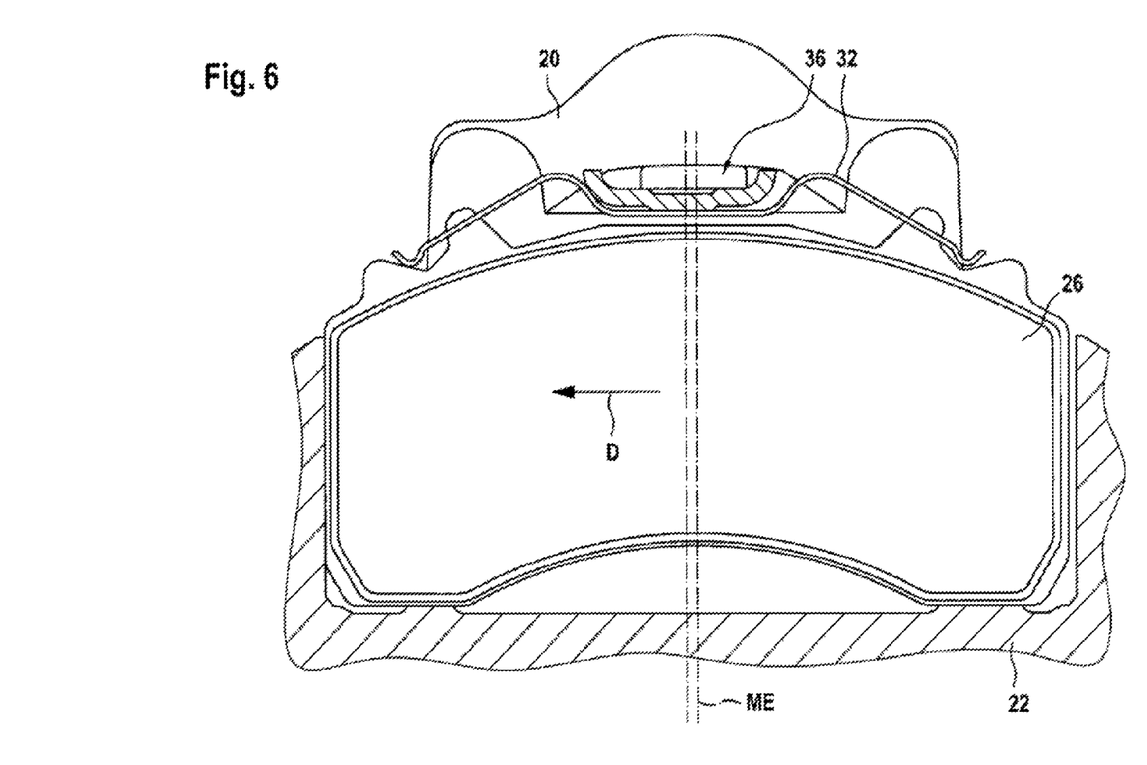
FIG. 6 shows a diagrammatic, sectional view of the brake according to FIGS. 3 and 4, FIG. 7 diagrammatically shows a hold-down yoke of the brake according to FIGS. 3 and 4, FIGS. 8 and 9 show the interaction of the hold-down yoke with the brake caliper.

FIGS. 1 and 2 show the brake according to EP 694 707 B3. Here FIG. 1 shows a brake lining 11, which is guided and supported radially inwards and on both sides in a circumferential direction in a channel guide of the brake caliper or back plate assembly, and on the radially outer edge of which lining a hold-down spring is supported, which is symmetrically formed to both sides of its center axis. Centrally, the hold-down spring comprises a radially deeper center area 3, from which the higher spring legs 6, 7 extend outwards on both sides along the outer edge of the lining, in order for the ends to then exert a spring action on the brake lining when a likewise symmetrically formed hold-down yoke 1 engages with a positive interlock in the here radially inward formed center area.

The hold-down yoke 1 is formed from round material. The spring pretensioning occurs when the hold-down yoke 1, as in FIG. 2, is anchored on the actuation side in interlock openings of the brake caliper, and on the other side is then fixed firmly but detachably by means of bolts to a bearing block of the brake caliper on the wheel-rim side. The hold-down yoke extends over a caliper opening serving for the fitting/removal of brake linings, supported on both sides of the brake disc, and in a direction towards the brake or center axis A.

In the axial direction of the brake linings, the hold-down springs are coupled to the brake lining, because radial shoulders 12, 14 of the outer edge of the brake lining pass through elongated openings 8, 9, 10 in the spring. At the ends, the spring legs bear against further radial shoulders 13, of the outer edge of the brake lining. The hold-down springs are embodied as leaf springs.

The radial and tangential pretensioning acting on the brake lining by means of the hold-down spring is generated, according to the state of the art, in that the hold-down yoke 1 engages with a positive interlock in the radially formed center area 3 of the hold-down spring and in turn is supported by positive interlock in actuation and wheel rim-side anchorages of the brake caliper, always offset towards the brake disc run-out side by an axial offset x relative to the center or brake axis A, in the direction of rotation of the brake disc in forwards travel. As a result, the corresponding spring leg is also forced in a tangential direction. For the eccentric positively interlocking support of the hold-down yoke 1, the requisite design shapes must be provided at corresponding positions in the brake caliper casting, and these design shapes then still have to undergo machining operations. The bearing points for the hold-down yoke 1 are therefore formed asymmetrically on/in the brake caliper.

The relevant brakes are fitted on both sides of the axle, so that they too need to be of mirror-symmetrical design. This means that for brake calipers according to the state of the art different casting pattern designs are required for a left-hand brake and a right-hand brake, in order to produce the asymmetrical support and holding areas. Accordingly, the positions of the subsequent machining operation for the support and holding areas in the case of a left-hand brake are different from those in that of a right-hand brake.

Owing to the aforementioned asymmetry, this principle with different caliper designs is an obstacle to economic and cost-efficient production of the brake calipers mass-produced by casting and machining.

The object of the invention, therefore, is to develop the brake according to EP 694 707 B3 in such a way that said disadvantages are eliminated. In particular, the object of the invention is to manufacture the caliper disc brake of the type specified at the beginning in a more efficient and more versatile manner.

According to the invention the stated object is achieved in a caliper disc brake of the aforementioned type in that the tangential pretensioning is at least partially attributable to the fact that the dimensions of the hold-down device, measured in a tangential direction from the centerline, are at least in parts greater on the disc run-out side than on the disc run-in side.

Here the invention is based on the finding that the holding device for the hold-down device or in other words the support areas for a hold-down yoke on the caliper can be designed symmetrically if the tangential pretensioning of the hold-down spring originates not from an asymmetry of the caliper, but rather an asymmetry of the hold-down device.

The advantages are thereby obvious, since the brake calipers of mirror-symmetrical design in the holding and support areas for the hold-down device on each axle in this respect no longer require different molds to form the casting design shape. Furthermore, the subsequent machining can be standardized.

According to the invention, the hold-down spring preferably lies on the actuation side. Specifically, according to the invention, it is preferable for the hold-down spring which holds down the brake lining lying on the actuation side and/or the pressure plate likewise lying on the actuation side, but not the hold-down spring which holds down the brake lining on the wheel rim side, to be pretensioned in the tangential direction. In this way, mechanically adverse moments are avoided.

According to the invention, it is furthermore preferably provided that the hold-down device bears, to generate the radial pretension, by way of a first region and, to generate the tangential pretension, by way of a second region, against the hold-down spring, and the spacing of the central point of the first region from the central point of the second region is smaller in the radial direction than in the tangential direction. In this way, the hold-down spring is considerably mechanically relieved of load, because in this way, regions of force introduction into the hold-down spring are remote from the regions of maximum bending load.

According to the invention, the first region is furthermore preferably formed on a radially inwardly extending bead. Inter alia, the advantages already mentioned above are attained in this way.

According to the invention, the second region is furthermore preferably oriented obliquely with respect to a radial plane containing the centerline. In this way, slight relative movements (sliding) during reversing movements of the hold-down spring are possible. This relieves the hold-down spring of load in critical zones.

In addition to the caliper disc brake described above, the invention also provides a hold-down device, in particular of a caliper disc brake of said type. According to the invention, the dimensions of the hold-down device, measured in a tangential direction from a centerline of a holding device which holds the hold-down device on a brake caliper of a caliper disc brake, are at least in parts greater on the disc run-out side than on the disc run-in side.

A hold-down device of said type is suitable for generating the tangential pretension, discussed above in detail, even when the holding device formed on the brake caliper for holding and supporting the hold-down device is symmetrical in relation to a radial plane containing the centerline, such that in this respect, there is no need for different casting moulds for a right-hand brake, on the one hand, and for a left-hand brake, on the other hand.

According to the invention, the hold-down device preferably has a projection which extends in the tangential direction and which lies on the disc run-out side and in the actuation-side region. In this way, in accordance with the statements made above, the desired tangential pretension can be generated on the actuation side, wherein such tangential pretension is avoided on the wheel-rim side.

As already mentioned above, according to the invention, the hold-down device preferably has a radially inwardly extending bead.

In a further preferred embodiment of the invention, a recess is provided in the direction of the axis of rotation, the side flanks of which recess, in interaction with the holding device, serve for the transmission of tangential forces. In this way, a mechanically particularly simple solution for the generation of the tangential pretension is realized.

According to the invention, the indentation is furthermore preferably symmetrical in relation to a radial plane containing the centerline. In this way, it is also possible for the holding device to be of symmetrical design on the brake caliper, which yields the advantages already mentioned above.

According to the invention, the recess furthermore preferably lies on the actuation side.

In a further preferred embodiment of the invention, a coding device is provided. The coding device furthermore preferably has a recess.

In a particularly preferred embodiment of the invention, the coding device lies on the wheel-rim side.

BRIEF DESCRIPTION OF THE DRAWINGS

The invention is explained in more detail below on the basis of preferred exemplary embodiments, referring to the drawing attached, in which.

DETAILED DESCRIPTION OF THE DRAWINGS

The exemplary embodiment of a caliper disc brake according to the invention represented in the drawing comprises a brake disc (not shown), the axis of rotation of which is denoted by A. The direction of rotation in forwards travel is denoted by an arrow D. The brake comprises a brake caliper 20 and a back plate assembly 22, the brake caliper gripping around the brake disc (not shown) like a frame. A wheel rim-side brake lining, comprising a metal backing plate with friction lining, is denoted by the reference numeral 24, an actuation-side brake lining, comprising a metal backing plate with friction lining, by the reference numeral 26 and a pressure plate by the reference numeral 28. The elements specified are force transmission elements. They are held down by hold-down springs 30, 32 and 34, that is to say they are pretensioned in a radial direction. As is explained further below, the brake lining 26 and the pressure plate 28 are also pretensioned in a tangential direction.

A hold-down device in the form of a hold-down yoke 36, which extends over a caliper opening serving for the fitting/removal of the brake linings supported on both side of the brake disc, serves for holding down said hold-down springs 30, 32 and 34. Here the hold-down yoke 36 is responsible not only for the radial pretensioning of the hold-down springs 30, 32 and 34 but also for the tangential pretensioning of the hold-down springs 32 and 34. By contrast, only a radial pretensioning, but not a tangential pretensioning, acts on the hold-down spring 30 and the brake lining 24. Moments originating from a tangential pretensioning of the hold-down spring 30 and the brake lining 24, which are detrimental to the operation of the brake and which effect the free sliding of the sliding caliper, are thereby avoided.

The brake caliper 20, which in the exemplary embodiment represented in the drawing is a sliding caliper, comprises a holding device for holding and supporting the hold-down yoke 36. This holding device comprises two areas, that is to say a wheel rim-side area 38 and an actuation-side area 40. In top view, both areas are formed symmetrically about a centerline M, which lies parallel to the axis of rotation A. They are also symmetrical in relation to a radial center plane ME, which is spanned by the axis of rotation A and the centerline M. This symmetry means that the contour of the holding device is such that one and the same mold can be used for casting the caliper, irrespective of whether the caliper is designed for a right-hand or a left-hand brake.

Forming part of the actuation-side area 40 of the holding device is a projection 42 of roof edge-like design. Its lateral flanks 44, 46 serve to absorb tangential forces. Its radially inner flank 48 serves to absorb radial forces.

On the actuation side, the hold-down yoke 36 is designed to match the projection 42. For example, it comprises a recess 50, which in the assembled state accommodates the projection 42. Lateral flanks 52 and 54 of the recess 50 here serve to transmit tangential forces. A radially outer face 56 serves to transmit radial forces. In the fitted state, it bears on the flank 48 of the projection 42 facing the brake disc.

In the wheel rim-side area 38 the caliper 20 comprises a threaded hole 58, into which a bolt 60 is screwed for fixing the hold-down yoke 36. Like the actuation-side area 40, the wheel rim-side area 38 of the holding device is designed symmetrically in relation to the centerline M and the center plane ME. Only the threaded hole 58 is not symmetrically situated, in order to prevent a hold-down yoke for a right-hand (left-hand) brake being fitted to a left-hand (right-hand) brake. It is not formed by casting but rather is made by means of a drill and/or a thread cutter after the actual casting of the caliper.

Figure 11:
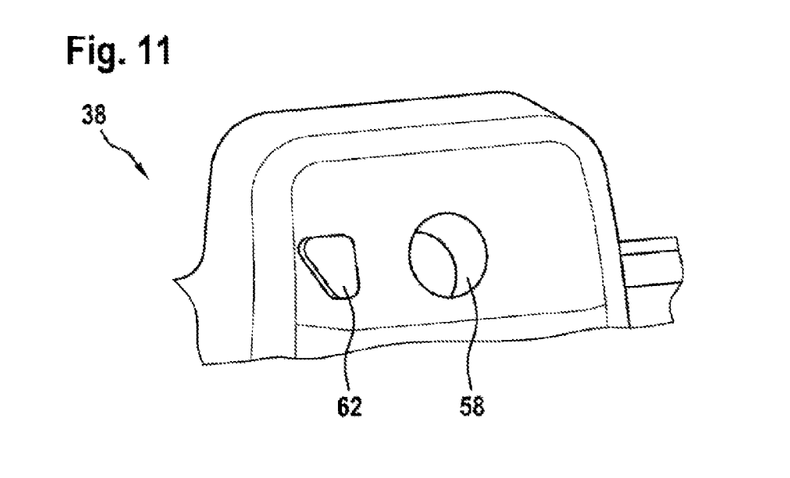
FIG. 11 shows a diagrammatic, partial view of another holding area of the caliper for the hold-down yoke.
Figure 12:
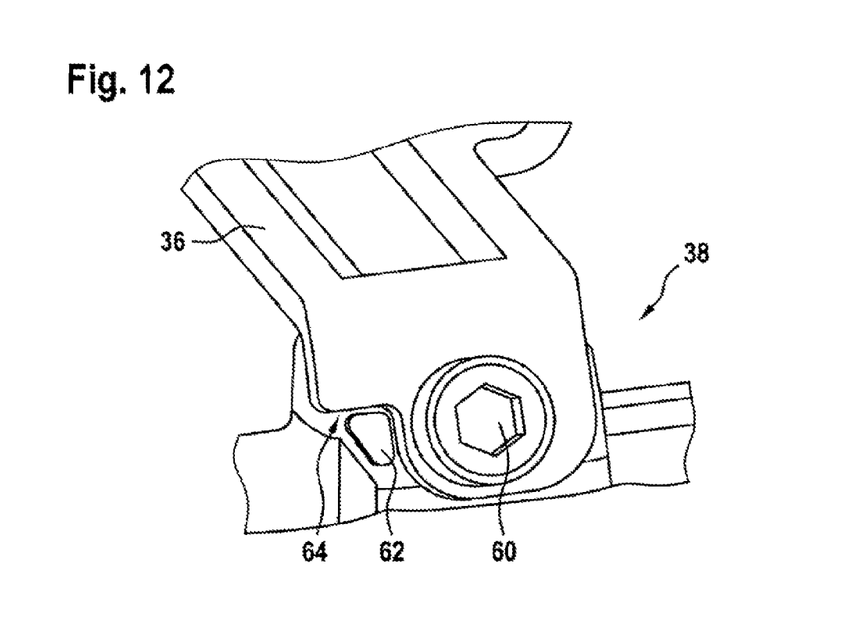
FIGS. 12 and 13 show two different embodiments of the fastening of the hold-down yoke on the wheel rim-side of the caliper.

A coding device is provided in the area 38 of the holding device. For this purpose, according to FIGS. 11 and 12 a protrusion 62 may be left during the machining, so that according to FIG. 12 only one such hold-down yoke 36 can be fitted, which has an aperture 64 matching the protrusion 62. Like the threaded hole 58, the protrusion 62 is not formed by casting and can therefore be arranged asymmetrically.

Figure 13:
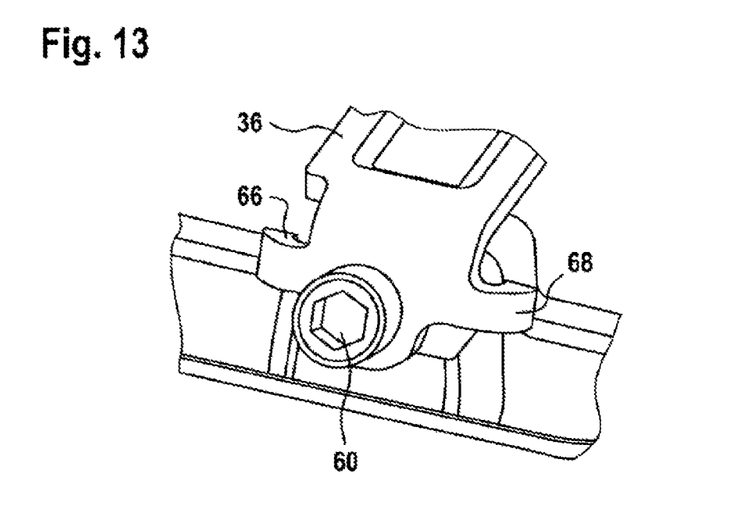

In addition or alternatively the hold-down yoke 36 according to FIG. 13 may comprise lugs, which grip around corresponding structures on the caliper 20. This again ensures that only one matching hold-down yoke 36 can be fitted.

The protrusion 62, the aperture 64 and the lugs 66 and 68 are therefore coding devices, which ensure that only one matching hold-down yoke is ever fitted to the caliper.

The hold-down yoke is asymmetrical in two different respects. Firstly it comprises tangential shoulders 70 and 72 only on the actuation side, not on the wheel-rim side. Secondly its dimensions V1, V2 measured in a tangential direction from the centerline M are greater in the area of the first projection 70, that is to say on the disc run-out side, than in the area of the projection 72, that is to say on the disc run-in side.

This configuration makes it possible to impress a tangential pretensioning on the actuation-side brake lining 26 and the pressure plate 28 situated on the actuation side, without the need for the brake caliper 20 to have a correspondingly asymmetrical design in the areas 38 and 40 of its holding device for the hold-down yoke 36 and without a disadvantageous tangential pretensioning acting on the wheel rim-side brake lining 24.

Figure 7:
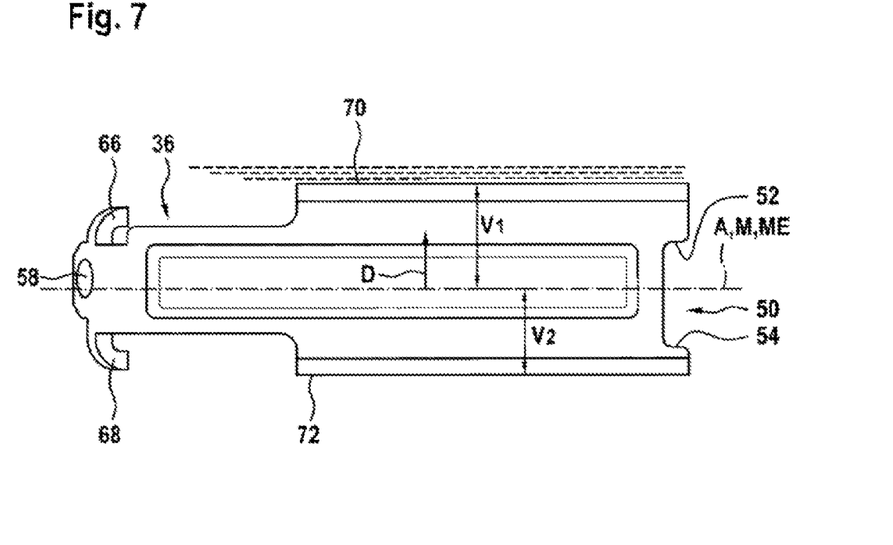
Figure 8:
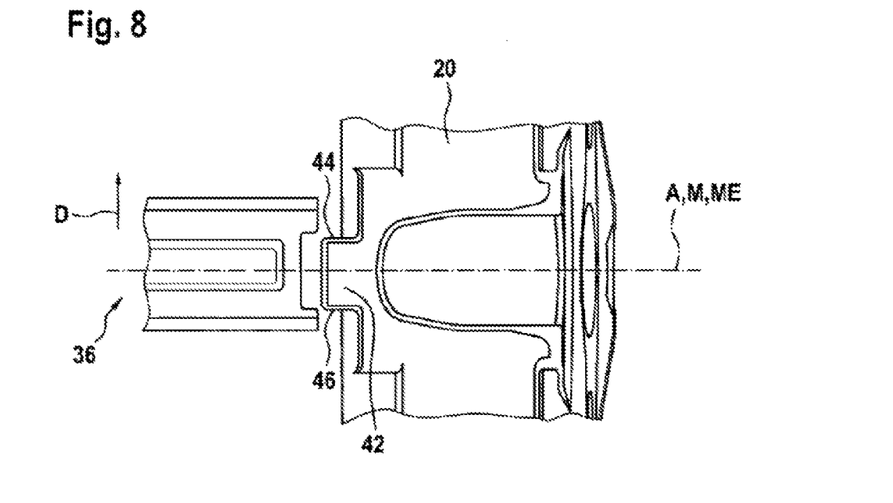
Figure 9:
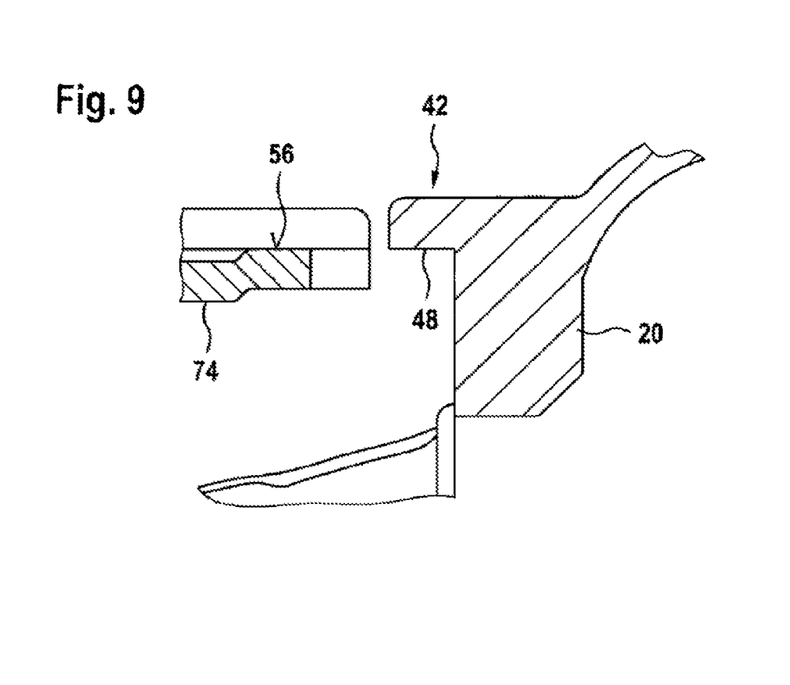
Figure 10:
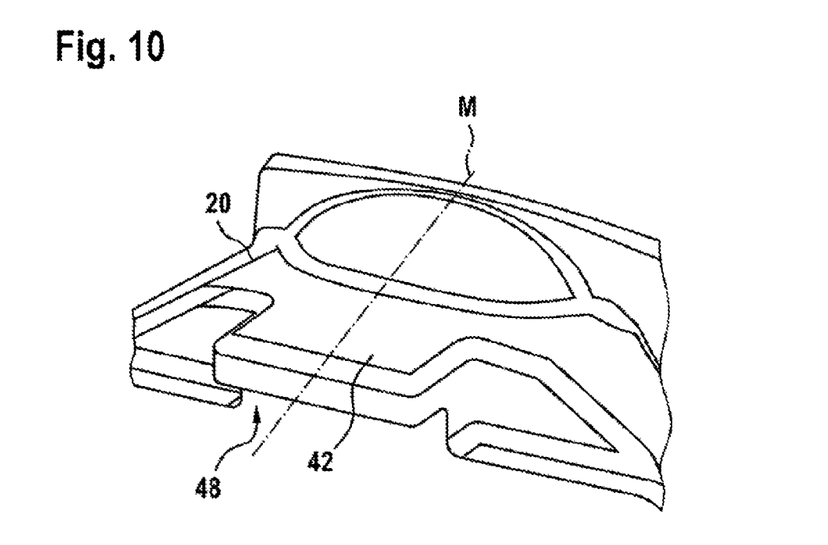
FIG. 10 shows a perspective, partial view of a holding area of the brake caliper for the hold-down yoke.

It is also easily possible, by applying different spring pretensions, purposely to control the variety of interactions with the hold-down springs. This can be done in that according to FIG. 7 it is only necessary to adjust the width V1 of the hold-down yoke in the direction of the dashed lines to the disc run-out. For this purpose it is only necessary to shape the sheet-metal pressing accordingly. Through interaction with the abovementioned codings it is then possible to make a precise assignment to the corresponding brake and its conditions of use, without having to make adaptations to the cast areas of the brake caliper in order to do this.

The hold-down yoke 36 is preferably produced as a shaped, sheet-metal pressing and comprises a bead, which is offset in relation to the centerline M and the radial plane R according to the difference between the dimensions V1 and V2. The bead is denoted by the reference numeral 74. In the assembled state it bears flatly on the respective hold-down spring 30, 32 and 34 and serves for impressing the radial pretensioning, cf. FIG. 19. In the configuration according to FIG. 20, by contrast, which corresponds to the state of the art, there is only a linear bearing contact. Such a linear bearing contact obviously imposes a considerably greater load on the hold-down spring than the flat bearing contact according to FIG. 19.

Design configurations of the hold-down spring in the form of a leaf spring can be inferred, in particular, from FIGS. 14 to 18. It comprises two identical spring legs 76, 78 and a trapezoidal center area 80 situated between them, which projects radially inwards. In the relaxed state the two legs of the trapezoidal area 80 each enclose an angle $\alpha$ of more than 95° with its base. In the exemplary embodiment represented in the drawing these angles are 117°. With each of the two adjacent spring legs 76, 78 they enclose an angle $\beta$ of less than 85°. In the exemplary embodiment shown the angle $\beta$ is 74°.

In the side view the springs are not angular. Rather, in the relaxed state they are each curved with a radius in each case of 10 mm to 16 mm in the transitional area between the two legs of the trapezoidal area 80 and its base, in the exemplary embodiment shown 13 mm, and in the transitional area between the trapezoidal area 80 and the spring legs 76, 78 they are curved with a radius of 4 mm to 9.5 mm, in the exemplary embodiment shown 7 mm.

Figure 14:
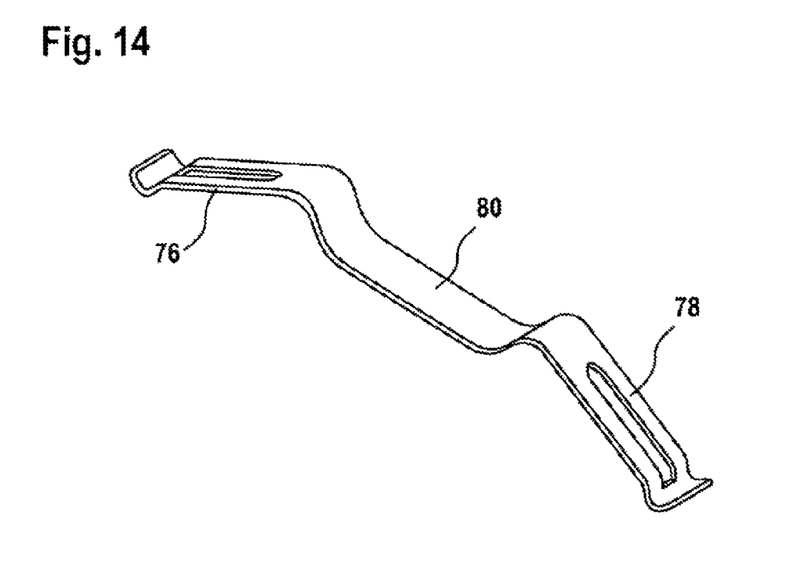
FIGS. 14 to 18 show different views of hold-down springs for the brake according to FIGS. 3 and 4, and FIGS. 19 and 20 show sectional views of the interaction of the hold-down yoke with the hold-down spring according to one exemplary embodiment of the invention and according to the state of the art.
Figure 15:
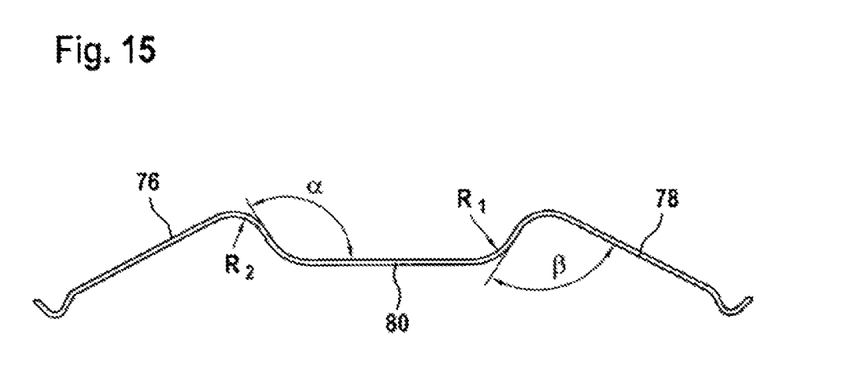
Figure 16:
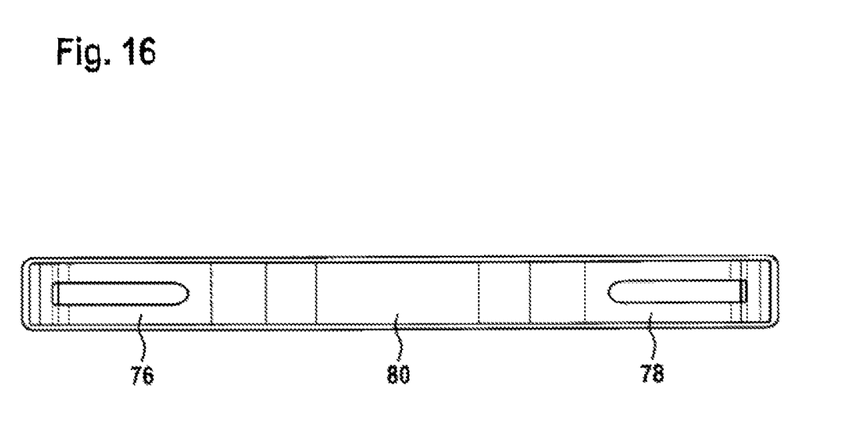
Figure 17:
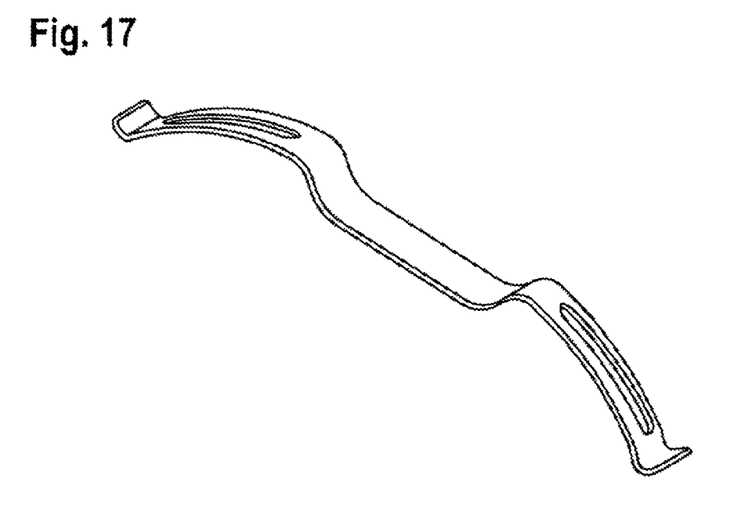
Figure 18:
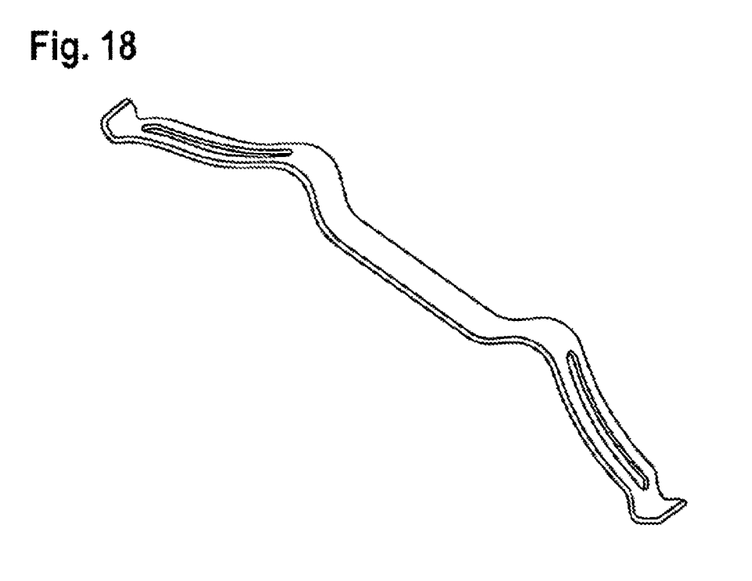

The spring legs 76, 78 may be of straight design according to FIGS. 14 to 16. They may also be of convex or concave design, however, as can be seen from FIGS. 17 and 18.

Figure 19:
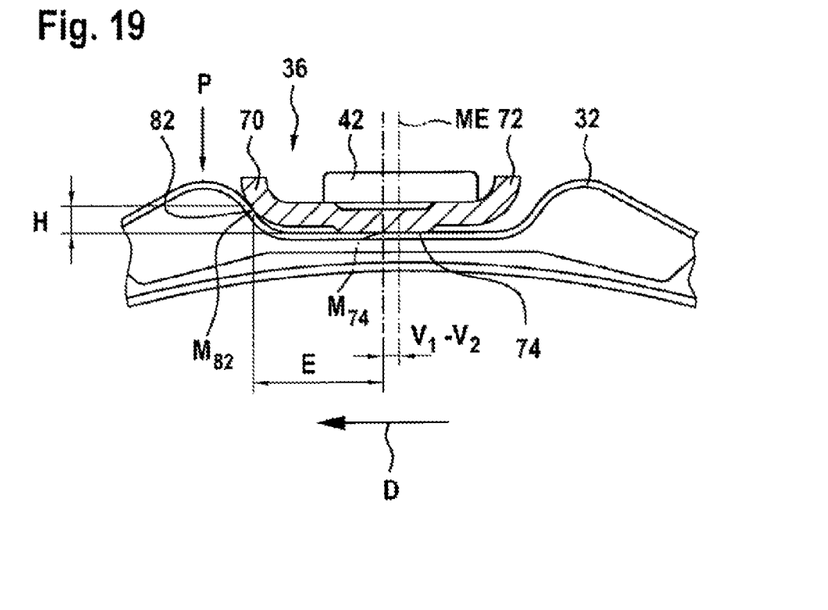

That area of the projection 70 which bears on the hold-down spring 32 is denoted in FIG. 19 by the reference numeral 82. Its center $M_{82}$ is separated from the center $M_{74}$ by the distance H in a radial direction and by the distance E in a tangential direction, where H<E. By contrast the corresponding bearing contact lines 15 and 16 in the state of the art are such that H=E, cf. FIG. 20.

In the exemplary embodiment represented in the drawing the site P of the greatest (compressive) stress lies in the hold-down spring 32, which is situated in the transitional area between the center area 74 and the spring leg 76, far removed from the (extensive) area of the greatest wear due to friction or to the radial impact of the brake lining or the pressure plate in the contact areas.

Figure 20:
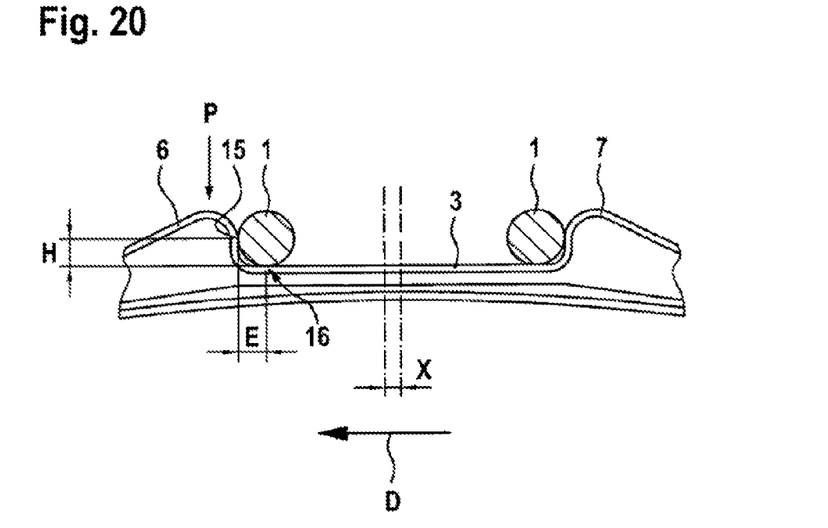

By contrast, under similar conditions of use, as specified above, according to the state of the art in FIG. 20 only a linear bearing contact occurs in the radial contact area, so that here the site of the greatest wear in the radial area with the linear bearing contact (see arrow) then directly and closely adjoins the area P of the greatest (compressive) stress in the hold-down spring, so that here H=E.

As can be seen from FIG. 19 in particular, the hold-down yoke 36 in cross section has a trough-like configuration, sloping away on the outside, that is to say at the ends of the projections 70, 72. This allows slight relative movements (sliding) during reversing movements of the hold-down spring. In the state of the art according to FIG. 20 with the round material, which bears against perpendicular spring portions, this is not the case. The inventive design reduces the stress loads in the critical zones.

Here too, as in the state of the art according to FIG. 1, the hold-down springs are coupled to the brake lining in the axial direction of the brake linings, because radial shoulders (12) of the outer edge of the brake lining pass through elongated openings (8, 9) in the two lateral spring legs of the spring. At the ends the spring legs bear against further radial shoulders (13, 13) of the outer edge of the brake lining. The hold-down springs are embodied as leaf springs.

The features of the invention disclosed in the description above, in the claims and in the drawing may be essential for the realization of the invention in its various embodiments both individually and in any combinations. While the above description constitutes the preferred embodiments of the present invention, it will be appreciated that the invention is susceptible to modification, variation and change without departing from the proper scope and fair meaning of the accompanying claims.

The invention claimed is:

1. A caliper disc brake of a vehicle, with
a brake disc having an axis of rotation (A),
a brake caliper (20), wherein the brake disc is configured to rotate from a disc run-in side of the brake caliper toward a disc run-out side of the brake caliper,
a back plate assembly (22),
a force transmission element, which is guided and supported in a channel of one of the brake caliper and the back plate assembly,
a hold-down spring (30, 32, 34) for holding down the force transmission element and
a hold-down device (36) held and supported on the caliper by a holding device (38, 40), the hold-down device pretensioning the hold-down spring radially against the force transmission element with a first portion (74) and pretensions the hold-down spring against the force transmission device tangentially in the direction of rotation (D) in forwards travel with a second portion (82) radially outward from the first portion with respect to the axis of rotation, wherein the holding device (38, 40) has a centerline (M) lying parallel to the axis of rotation,
wherein the tangential pretensioning is at least partially attributable to the fact that the dimensions ($V_1$, $V_2$) of the hold-down device (36), measured in a tangential direction from the centerline (M), are at least in parts greater on the disc run-out side than on the disc run-in side.

2. The caliper disc brake as claimed in claim 1, wherein the hold-down spring (32, 34) lies on an actuation side, which is an axial side of the brake caliper, from which an actuation force is applied to the caliper disc brake.

3. The caliper disc brake as claimed in claim 1, wherein a spacing of the central point ($M_{74}$) of the first portion from the central point ($M_{82}$) of the second portion is smaller in the radial direction than in the tangential direction (H<E).

4. The caliper disc brake as claimed in claim 3, wherein the first portion is formed on a radially inwardly extending bead (74).

5. The caliper disc brake as claimed in claim 3, wherein the second portion is oriented obliquely with respect to a radial plane (ME) containing the centerline (M).

6. The caliper disc brake as claimed in claim 1, wherein the hold-down device comprises a recess (50) in the direction of the axis of rotation (A), the recess having side flanks (52, 54) one of which, in interaction with the holding device (38, 40), forms the second portion.

7. The caliper disc brake as claimed in claim 6, wherein the recess (50) is symmetrical in relation to a radial plane (ME) containing the centerline (M).

8. The caliper disc brake as claimed in claim 6, wherein the recess (50) lies on an actuation side, which is an axial side from which an actuation force is applied to the caliper disc brake.

9. The caliper disc brake as claimed in claim 1, wherein the holding device comprises a coding device (62, 64; 66, 68).

10. The caliper disc brake as claimed in claim 9, wherein the coding device (62, 64; 66, 68) comprises a recess (64).

11. The caliper disc brake as claimed in claim 9, wherein the coding device (62, 64; 66, 68) lies on a rim-side of the brake disc, which is an axial side of the brake disc, on which a wheel rim is located.

* * * * *